(12) United States Patent
Bhat et al.

(10) Patent No.: US 12,304,130 B2
(45) Date of Patent: May 20, 2025

(54) METHOD FOR BLOW MOLDING CONTAINERS

(71) Applicant: PepsiCo, Inc., Purchase, NY (US)

(72) Inventors: Advait Bhat, White Plains, NY (US); Girish Nilkanth Deshpande, Carmel, NY (US); David Robert McKelvey, Belfast (GB)

(73) Assignee: PepsiCo, Inc., Purchase, NY (US)

( * ) Notice: Subject to any disclaimer, the term of this patent is extended or adjusted under 35 U.S.C. 154(b) by 310 days.

(21) Appl. No.: 16/803,354

(22) Filed: Feb. 27, 2020

(65) Prior Publication Data

US 2021/0268713 A1 Sep. 2, 2021

(51) Int. Cl.
*B29C 49/12* (2006.01)
*B29C 49/00* (2006.01)
B29K 67/00 (2006.01)
B29L 31/00 (2006.01)

(52) U.S. Cl.
CPC .......... *B29C 49/12* (2013.01); *B29C 49/0005* (2013.01); *B29K 2067/003* (2013.01); *B29L 2031/712* (2013.01)

(58) Field of Classification Search
CPC ... B29C 49/12; B29C 49/0005; B29C 51/422; B29C 49/6436; B29C 49/0073; B29C 2049/024; B29C 43/52; B29C 2043/522; B29C 13/02; B29C 13/023; B29C 2013/027; B29C 17/04; B29C 49/08; B29C 49/42; B29C 49/06; B29C 49/4273; B29K 2067/003; B29L 2031/712; B65D 23/00

See application file for complete search history.

(56) References Cited

U.S. PATENT DOCUMENTS 4,047,869 A * 9/1977 Mulvany, Jr. ......... B29C 51/422
425/149
4,151,250 A 4/1979 Barry et al.
(Continued)

OTHER PUBLICATIONS

International Search Report and Written Opinion in International Application No. PCT/US2021/018838, mailed Apr. 29, 2021 (9 pages).

(Continued)

*Primary Examiner* — Alison L Hindenlang
*Assistant Examiner* — Shibin Liang
(74) *Attorney, Agent, or Firm* — Sterne, Kessler, Goldstein & Fox P.L.L.C.

(57) ABSTRACT

A method for blow molding a container includes heating a central region of a preformed puck to a first temperature, and heating an annular region surrounding the central region of the preformed puck to a second temperature that is greater than the first temperature. The heated preformed puck is arranged at an upper end of a mold cavity of a mold that defines an outer shape of the container. The heated preformed puck is secured to the upper end of the mold cavity. The heated reformed puck is stretched by pressing a plunger into the heated preformed puck and into the mold cavity in a longitudinal direction of the mold cavity toward a lower end of the mold cavity. Pressurized air is then applied to the mold cavity so that the heated preformed puck stretches to conform to the shape of the inner wall of the mold cavity.

19 Claims, 11 Drawing Sheets

(56) References Cited

U.S. PATENT DOCUMENTS

| | | | | |
|---|---|---|---|---|
| 4,327,052 | A | * | 4/1982 | Sauer .................... B29C 49/12 |
| | | | | 264/512 |
| 4,512,735 | A | | 4/1985 | Nilsson et al. |
| 4,619,806 | A | | 10/1986 | Gunn |
| 4,641,758 | A | * | 2/1987 | Sugiura ................... B65D 1/10 |
| | | | | 215/42 |
| 4,993,567 | A | | 2/1991 | Eberle, Jr. |
| 5,198,176 | A | | 3/1993 | Fortin |
| 11,110,640 | B2 | * | 9/2021 | Clarke ............... B29C 49/4273 |
| 2008/0044603 | A1 | * | 2/2008 | Hutchinson ........... B65D 51/20 |
| | | | | 428/35.7 |
| 2017/0066677 | A1 | | 3/2017 | Bookbinder et al. |
| 2017/0100872 | A1 | * | 4/2017 | Clarke ............... B29C 49/4247 |

OTHER PUBLICATIONS

Extended European Search Report in counterpart European Application No. 21761012.0, mailed Feb. 20, 2024 (7 pages).

* cited by examiner

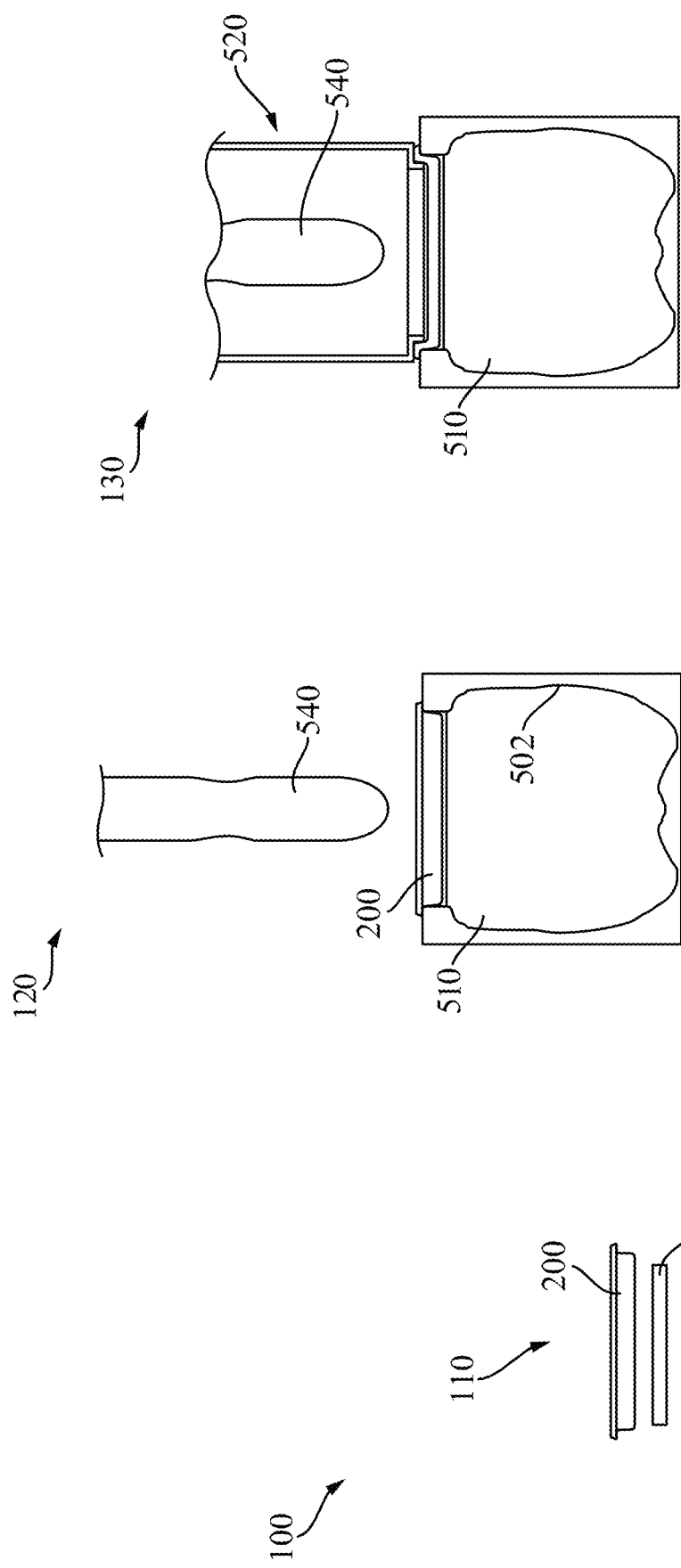

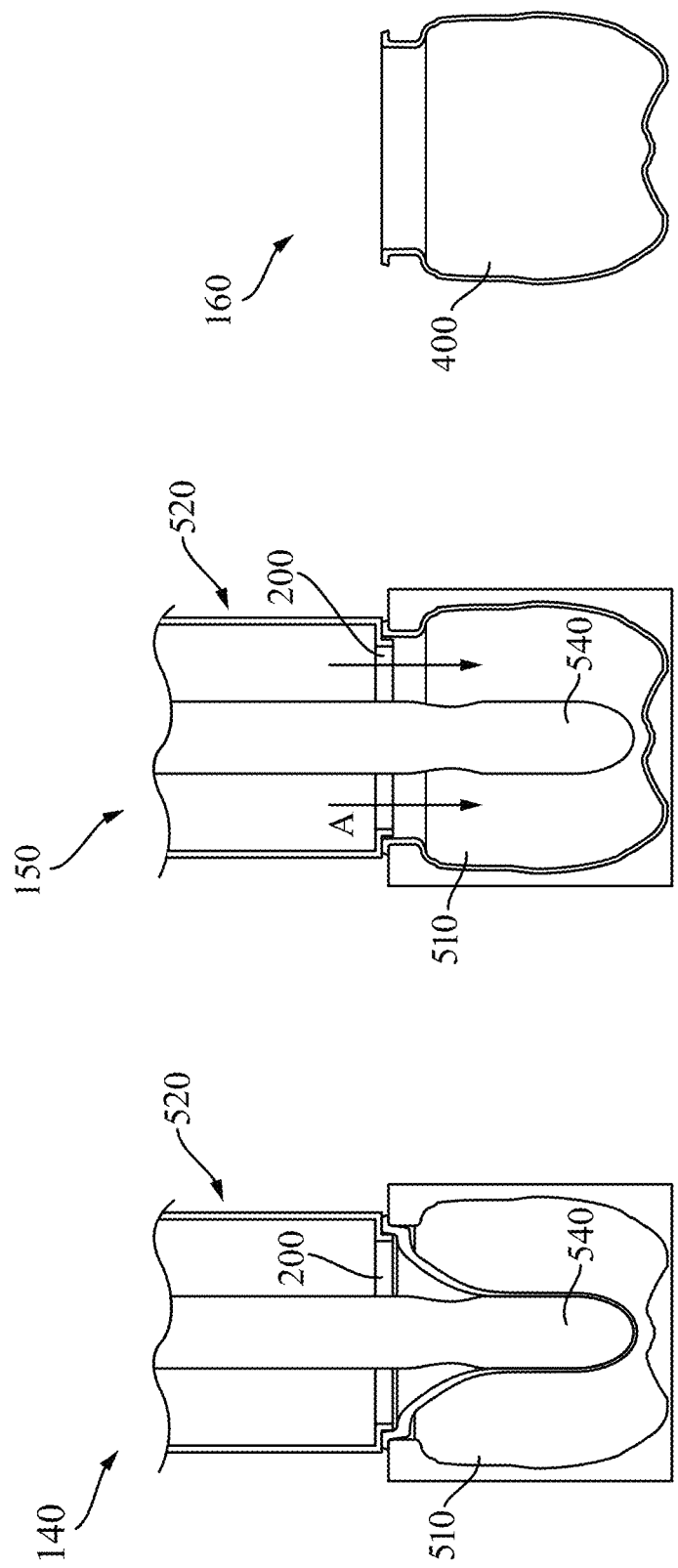

METHOD FOR BLOW MOLDING CONTAINERS

FIELD

Embodiments described herein generally relate to methods for blow molding a container. Specifically, embodiments described herein relate to methods for blow molding a container, such as a beverage container or ingredient cartridge, using a preformed puck.

BACKGROUND

Hollow articles, such as beverage containers and beverage ingredient cartridges, are often formed by blow molding methods. Blow molding methods include extrusion blow molding and injection blow molding, such as injection stretch blow molding (ISB). In ISB molding methods, a preform can be used as the starting material for forming the container. The preform can be heated above its glass transition temperature and arranged on a mold cavity that defines an outer shape of the container. A plunger or rod can be used to press on the heated preform so as to push a portion of the preform into the mold cavity, causing the preform to stretch and deform. A gas can then be applied or "blown" into the mold cavity so as to cause the preform to further stretch and deform and to press the preform material against the mold cavity in order to provide a container having the shape defined by an inner wall of the mold.

SUMMARY OF THE INVENTION

Some embodiments described herein relate to a method for blow molding a container, that includes heating a central region of a preformed puck to a first temperature, and heating an annular region surrounding the central region of the preformed puck to a second temperature, wherein the second temperature is greater than the first temperature. The method may further include arranging the heated preformed puck at an upper end of a mold cavity of a mold, wherein an inner wall of the mold cavity defines an outer shape of the container, stretching the heated preformed puck by pressing a plunger into the heated preformed puck and into the mold cavity in a longitudinal direction of the mold cavity toward a lower end of the mold cavity, and applying pressurized air to the mold so that the heated preformed puck stretches to conform to the shape of the inner wall of the mold cavity.

Some embodiments described herein relate to a method of blow molding a container, that includes heating a preformed puck to a temperature at or above a glass transition temperature of a material of the preformed puck, and arranging the preformed puck at an upper end of a mold cavity of a mold, wherein the preformed puck comprises a circular plate having an upstanding wall at a perimeter of the circular plate, and a flange extending outwardly from an upper end of the upstanding wall, and wherein an inner wall of the mold cavity defines an outer shape of the container. The method may further include securing the preformed puck to the upper end of the mold cavity by a securing member of the mold such that the flange is secured between the upper end of the mold cavity and the securing member, stretching the heated preformed puck by pressing a plunger into the heated preformed puck and into the mold cavity along a longitudinal axis of the mold cavity, and applying pressurized air to the mold cavity so that the preformed puck stretches to conform to the inner wall of the mold cavity.

Some embodiments described herein relate to a method of forming a container, that includes heating the preformed puck non-uniformly such that a first portion of the preformed puck is at a first temperature and a second portion of the preformed puck is at a second temperature that differs from the first temperature, and arranging the heated preformed puck at an upper end of a mold cavity of a mold, wherein an inner wall of the mold cavity defines an outer shape of the container. The method may further include securing the heated preformed puck to the upper end of the mold cavity, stretching the heated preformed puck using plunger by pressing the plunger into the heated preformed puck and into the mold cavity along a longitudinal direction of the mold cavity, and applying pressurized air to the mold cavity when the plunger is at a depth of 50% to 90% of a depth of the mold cavity so that the heated preformed puck conforms to a shape of the inner wall of the mold cavity.

In any of the various embodiments described herein, stretching the heated preformed puck may include using the plunger having a maximum diameter that is the same as a diameter of the central region of the preformed puck.

In any of the various embodiments described herein, heating the central region and the annular region may include conductive heating.

In any of the various embodiments described herein, applying pressurized air may be performed with a tip of the plunger spaced from a lower end of the mold cavity.

In any of the various embodiments described herein, applying pressurized air may include applying the air at a pressure of 15 bar to 20 bar.

In any of the various embodiments described herein, the method may further include maintaining a second annular region surrounding the annular region at a third temperature that is less than each of the first temperature and the second temperature.

In any of the various embodiments described herein, the second temperature may be 1° C. to 25° C. greater than the first temperature.

In any of the various embodiments described herein, the preformed puck may include a circular plate having an upstanding wall at a perimeter of the circular plate and a flange extending outwardly from an upper end of the upstanding wall.

In any of the various embodiments described herein, the preformed puck may be formed of polyethyelene terephthalate.

In any of the various embodiments described herein, heating the preformed puck may include non-uniformly heating the preformed puck.

In any of the various embodiments described herein, the method may further include heating a central region of the preformed puck to a first temperature, and heating an annular region of the preformed puck surrounding the central region to a second temperature that is greater than the first temperature.

In any of the various embodiments described herein, the plunger may have a maximum diameter that is 30% to 60% of a diameter of an opening of the mold cavity.

In any of the various embodiments described herein, the circular plate may have a greater thickness than a thickness of the flange of the preformed puck.

In any of the various embodiments described herein, pressurized air may be applied to the mold cavity when the plunger is at a depth of 60% to 80% of the depth of the mold cavity.

In any of the various embodiments described herein, stretching the heated preformed puck may include pressing the plunger with a speed of 0.10 m/s to 0.25 m/s.

In any of the various embodiments described herein, the preformed puck may include a flange at a perimeter of the circular plate, wherein the flange is not stretched during stretching the heated preformed puck.

In any of the various embodiments described herein, the plunger may include a rounded tip configured to contact the heated preformed puck.

In any of the various embodiments described herein, the plunger may be formed of metal.

BRIEF DESCRIPTION OF THE DRAWINGS/FIGURES

The accompanying drawings, which are incorporated herein and form a part of the specification, illustrate the present disclosure and, together with the description, further serve to explain the principles thereof and to enable a person skilled in the pertinent art to make and use the same.

FIGS. 1A-F shows a flow diagram illustrating the steps of a method for blow molding a container according to an embodiment.

DETAILED DESCRIPTION OF THE INVENTION

Figure 2:
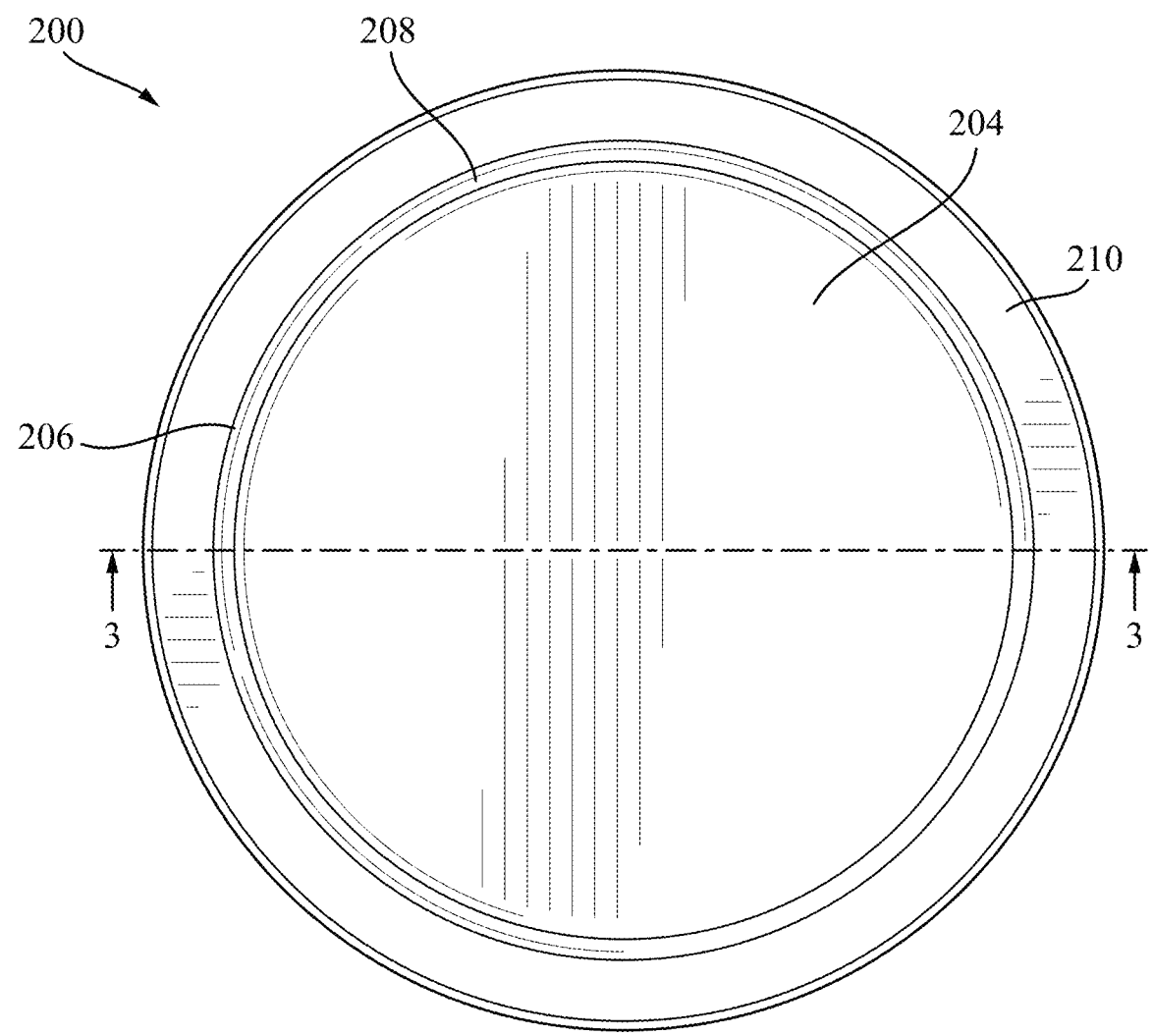
FIG. 2 shows a top-down view of a preformed puck for blow molding an article according to an embodiment.

Reference will now be made in detail to representative embodiments illustrated in the accompanying drawing. It should be understood that the following descriptions are not intended to limit the embodiments to one preferred embodiment. To the contrary, it is intended to cover alternatives, modifications, and equivalents as can be included within the spirit and scope of the described embodiments as defined by the claims.

Beverage containers, and the like are often filled by a hot filling process in which the liquid filled into the beverage container is heated to high temperatures of 90° C. or more so as to sterilize the interior of the container. As a result, the beverage container must be manufactured so as to withstand the high temperatures experienced during the filling operation. This may require the beverage container to be manufactured from materials having a glass transition temperature above the temperature of the hot filling process, and the wall thickness of the beverage container may depend on the material used to form the container so that the container has the desired structural properties.

Beverage containers may alternatively be filled by an aseptic filling process in which the beverage is flash heated for several minutes and is then filled into a container at a lower temperature. Thus, the beverage container is not subjected to high temperatures as in the hot filling process. In such aseptic filling processes, the same beverage containers that are used in hot filling processes may be used. However, the beverage containers are not exposed to high temperatures and it is therefore possible to redesign the beverage container to have a lower wall thickness and to use less material while still providing a container having the desired performance characteristics. As thousands of beverage containers are produced, substantial savings (e.g., in cost, material, and weight) can be realized by manufacturing beverage containers with less material.

Beverage containers may be formed by blow molding, such as injection stretch blow (ISB) molding. However, various problems may arise in the blow molding process, particularly when using polyethylene terephthalate (PET). Conditions suitable for blow molding polypropylene (PP) or other materials may not be suitable for blow molding PET, due to differences in the physical properties. For example, it may be difficult to cause the preform to completely fill the mold cavity to provide a container with the desired shape, particularly for containers having complex shapes. Further, it may be difficult to control the thickness of the container in different portions of the container, which may be desirable to ensure that the completed container has the desired performance characteristics. It may also be difficult to form a container having a horizontal or flat flange that is perpendicular to a longitudinal axis of the container.

Some embodiments described herein relate to a method for blow molding a container that allows for improved control of the wall thickness of the resulting container. Some embodiments described herein relate to a method for blow molding a container that allows for improved uniformity and consistency in producing containers that fully conform to the shape of the mold. Some embodiments described herein relate to a method for blow molding a container by securing a preformed puck having a flange to an upper end of a mold cavity using a securing member such that the shape and orientation of the flange is preserved during the molding process in order to provide a container having a horizontal or flat flange.

As used herein, the term "container" may refer to any article having one or more walls defining an interior volume in which a substance, such as a liquid or solid, may be held. A container may refer to, for example, a beverage container, such as a bottle, or a beverage ingredient cartridge or pod for storing liquid or dry ingredients, among others.

Some embodiments described herein relate to a method for blow molding a container 100, as shown for example in FIGS. 1A-1F. In operation, a preformed puck 200 is used as the starting material for molding the container. In operation 110, the preformed puck 200 is heated to a temperature at or above its glass transition temperature so that the preformed puck 200 is compliant, such as by a conductive heating element 600. In operation 120, the preformed puck 200 is arranged on an upper end of a mold cavity 510 of a mold 500, wherein mold cavity 510 has an inner wall 502 that defines an outer shape of a resultant container 400. In operation 130, preformed puck 200 is secured to the upper end of mold cavity 510 via a securing member 520 of mold 500. In operation 140, a portion of the preformed puck 200 is stretched into mold cavity 510 by a plunger 540 of mold 500. In operation 150, the plunger 540 may be moved in a longitudinal direction (downward in FIG. 1D) of mold cavity 510 toward a lower end of mold cavity 510. Once the preformed puck 200 is stretched, pressurized air (represented by arrows A in FIG. 1E) is applied to the mold cavity 510 so as to cause the stretched preform material to conform to a shape of the inner wall 502 of mold cavity 510. In operation 160, the mold and the molded container may be cooled and the molded container can be removed from the mold. Optionally, one or more finishing operations may be performed on the molded container, such as to remove flash, apply a surface treatment, apply a design or decoration, or to apply a texture, among others.

Figure 3:
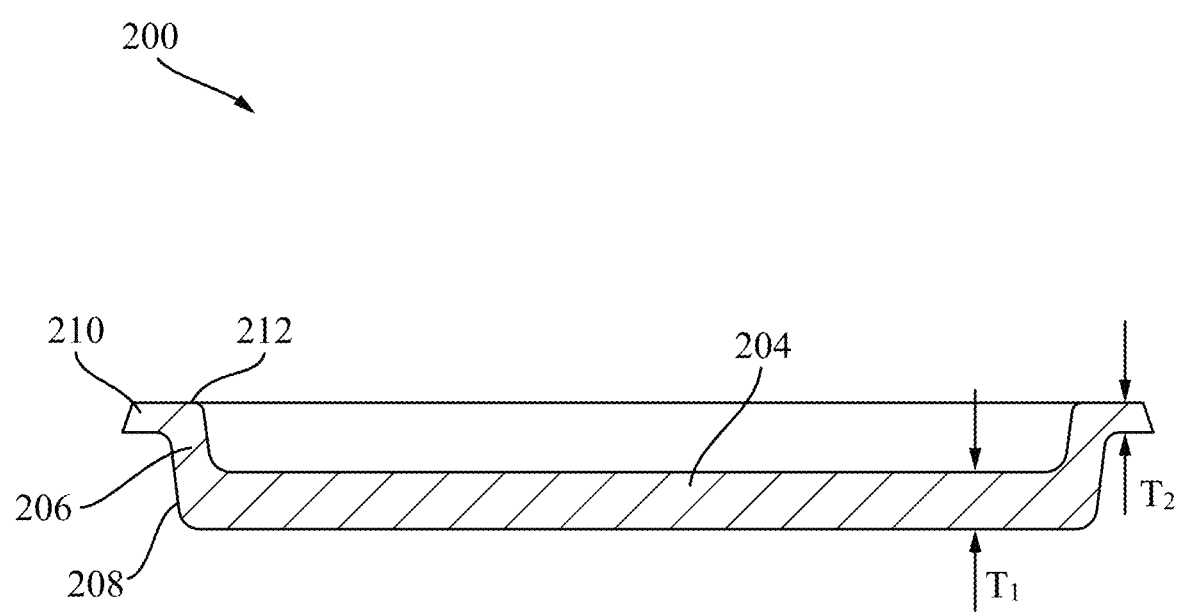
FIG. 3 shows a cross-sectional view of the preformed puck of FIG. 2.

In some embodiments described herein, a preformed puck 200 for use in blow molding a beverage container is shown at FIGS. 2 and 3. Preformed puck 200 may have a generally circular shape in a top-down view, as shown in FIG. 2. Preformed puck 200 may include a circular plate 204 and an upstanding wall 206 extending from circular plate 204 at a perimeter 208 of circular plate 204. Upstanding wall 206 may be substantially perpendicular to circular plate 204. Upstanding wall 206 may extend around an entire perimeter 208 of circular plate 204. Preformed puck 200 may further include a flange 210 extending outwardly from an upper end 212 of upstanding wall 206, such that flange 210 is an outermost portion of preformed puck 200. Flange 210 may extend entirely around upstanding wall 206 such that flange 210 has an annular shape. Further, flange 210 may be arranged in a plane that is generally parallel to a plane of circular plate 204. Circular plate 204 may have a thickness $T_1$ that is greater than a thickness $T_2$ of flange, wherein thickness is measured from a first surface of preformed puck 200 to an opposing second surface.

Figure 4:
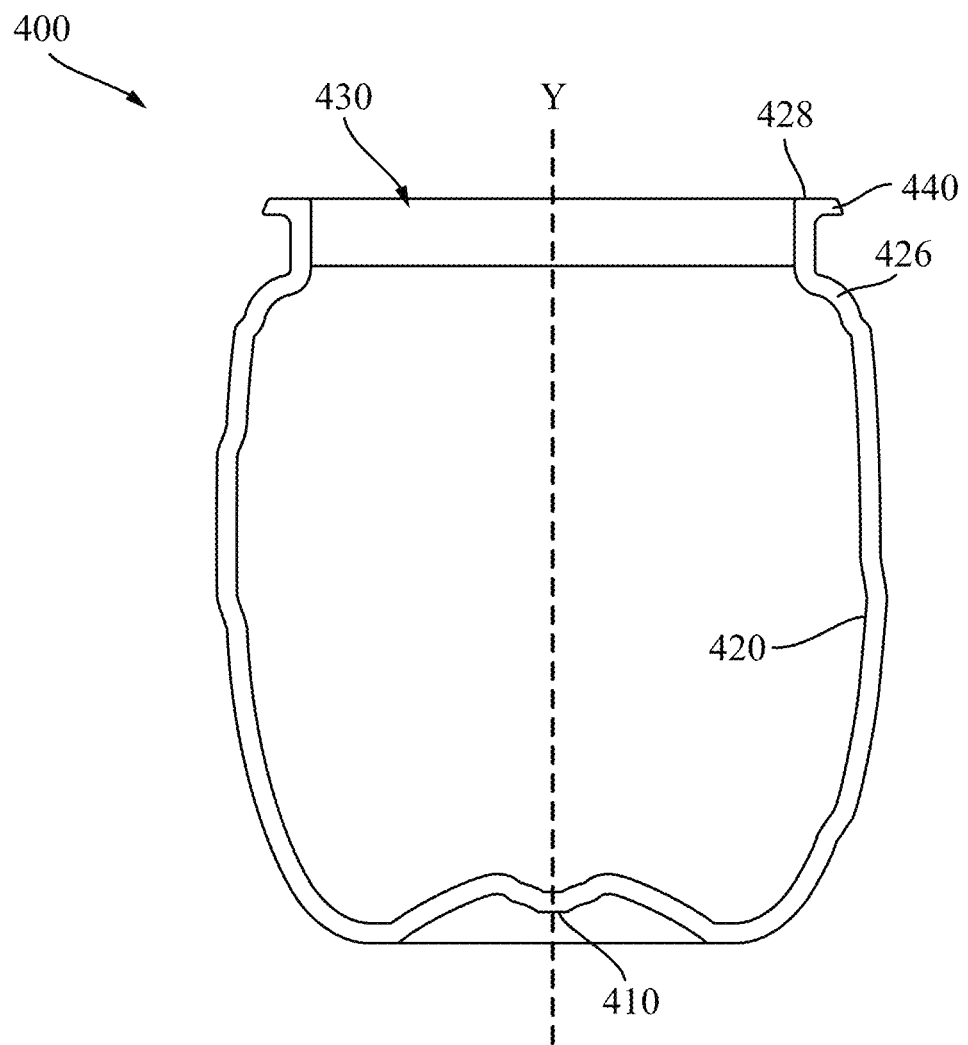
FIG. 4 shows a side view of a beverage cartridge formed by a blow molding method according to an embodiment.

Preformed puck 200 may be used to form a hollow article 400, such as a beverage ingredient cartridge, as shown for example in FIG. 4. Article 400 may include a base 410 defining a lowermost portion of article 400 and a sidewall 420 extending from base 410. Sidewall 420 and base 410 define an interior volume of beverage cartridge. Sidewall 420 may further define an opening 430 at an upper end 428 of sidewall 420 of article 400. Hollow article 400 may include a shoulder region 426 as sidewall 420 transitions to opening 430 at upper end 428, such that a diameter of opening 430 is smaller than a maximum diameter of hollow article 400 at sidewall 420. In some embodiments, a flange 440 may extend outwardly from upper end 428 of sidewall 420. Flange 440 may surround opening 430 of hollow article 400, such that flange 440 has an annular shape. Flange 440 may facilitate securement of a closure to article 400, such as a plastic membrane or a metal film, foil, or cap, so as to cover and seal opening 430 of article 400. Flange 440 may not include threading, and a closure such as a plastic membrane or foil, may be secured to flange 440 by bonding, adhesives, or ultrasonic welding, among other fastening methods. Flange 440 may be arranged in a plane so that flange 440 is substantially flat. Further, flange 440 may be arranged in a plane that is perpendicular to longitudinal axis Y of article 400.

In some embodiments, a hollow article 400, such as a container, formed by a method herein may have a volume of about 1 oz to 10 oz (30 mL to 300 mL). In order to form a hollow article 400 with a greater size or volume, a larger or thicker preformed puck may be used, and as the thickness of the preformed puck increases, the puck may become less compliant and may be harder to stretch using a plunger as described in further detail herein.

In some embodiments, flange 210 of preformed puck 200 may correspond to a flange 440 of the resulting article 400. When molded, circular plate 204 may correspond to a base 410 of the resulting article 400 and also sidewall 420 of article 400. Upstanding wall 206 may correspond to an upper portion of sidewall 420 of article 400, such as shoulder region 426 as shown in FIG. 4.

Figure 5:
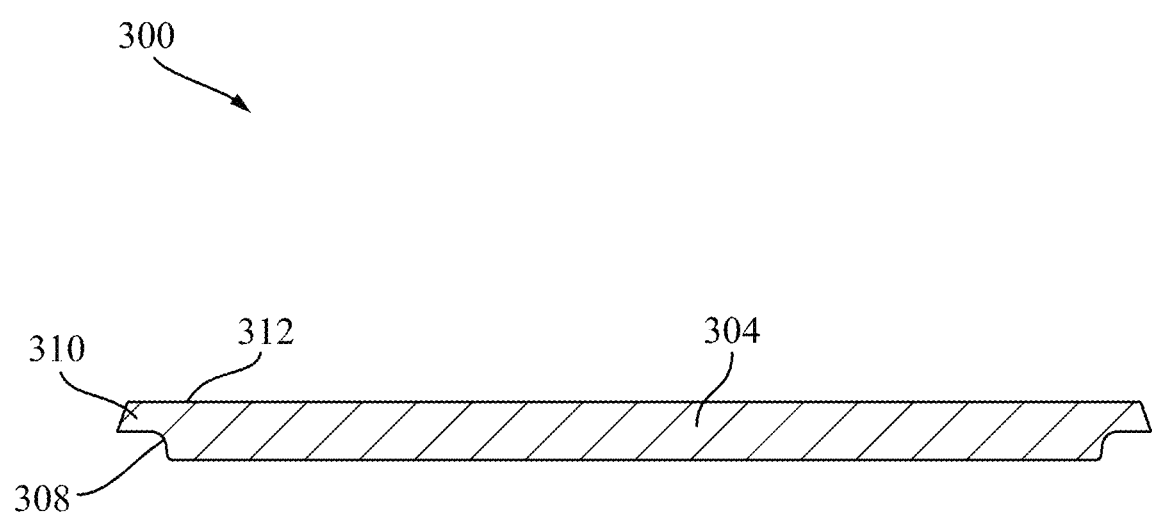
FIG. 5 shows a cross-sectional view of a preformed puck for blow molding an article according to an embodiment.

In some embodiments, a preformed puck 300 may include a circular plate 304 and a flange 310 extending outwardly from an outer perimeter 308 of circular plate 304, as shown in FIG. 5. Flange 310 may extend from an upper end 312 of circular plate 304. Thus, in such embodiments, preformed puck 300 does not include an upstanding wall as in the preformed puck 200 of FIGS. 2 and 3. Instead, a top surface of circular plate 304 may be coplanar with a top surface of flange 310, as shown in FIG. 5. Preformed puck 300 having flange 310 may help to produce an article having a flange, as discussed above with respect to preformed puck 200. However, as puck 300 lacks an upstanding wall, puck 300 may have less ability to allow for tailoring of wall thickness of the resulting article. Increasing a thickness of preformed puck 300 beyond a certain extent may make puck 300 less compliant and deformable such that puck 300 cannot be easily stretched and the material uniformly distributed during molding.

In some embodiments, preformed puck 200, 300 may be formed from a plastic, such as polyethylene terephthalate (PET). Preformed pucks 200, 300 may include recycled PET, and may include about 30% recycled PET to about 100% recycled PET. In some embodiments, preformed pucks 200, 300 may include a multilayer PET (e.g., with a gas barrier layer disposed between layers of PET). However, in some embodiments, preformed puck 200, 300 may be formed from polypropylene (PP), polyolefins, polyesters, polyethylene furanoate (PEF), polyethylene naphthalates, polyglycolide (PGA), or a combination thereof, among other recyclable thermoplastic materials, among other materials.

Preformed puck 200, 300 may be formed by a molding method, such as compression molding, transfer molding, or injection molding, among other molding methods. Preformed pucks 200, 300 may be easily stored and transported to a location for blow molding a container using the preformed pucks 200, 300.

For the sake of clarity, the following discussion will refer to preformed puck 200. However, it is understood that the following applies equally to preformed puck 300 except where expressly noted. In order to form an article from preformed puck 200, preformed puck 200 may be heated to an elevated temperature at or above a glass transition temperature of preformed puck 200. In this way, preformed puck 200 may become compliant so as to fill the mold and conform to a shape of the inner wall of the mold to provide a container having an outer shape as defined by the mold.

Figure 6:
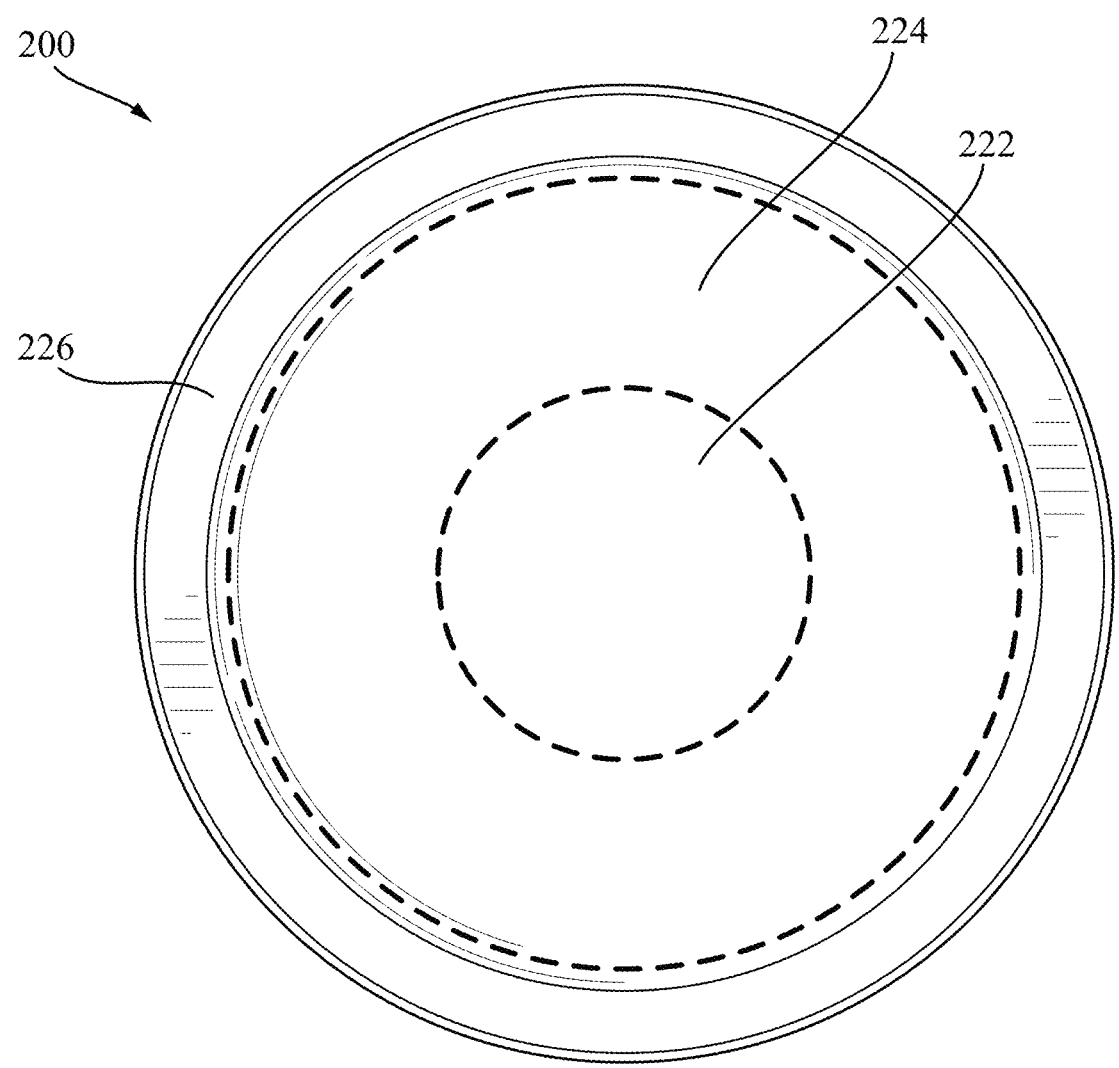
FIG. 6 shows a top down view of a preformed puck illustrating regions of the preformed puck of FIG. 2 for heating to different temperatures.

In some embodiments, blow molding an article using a preformed puck 200 may include heating preformed puck 200 non-uniformly, such that different regions of the preformed puck 200 are heated to different temperatures, as shown in FIG. 6. For example, preformed puck 200 may be heated such that a first region 222 of preformed puck 200 is heated to a first temperature and a second region 224 is heated to a second temperature that differs from the first temperature. In some embodiments, heating of preformed puck 200 may vary along a diameter of preformed puck 200. In some embodiments, a central region 222 of preformed puck may be heated to the first temperature, and an annular region 224 surrounding central region 222 may be heated to a second temperature that differs from the first temperature.

Central region 222 may have a generally circular shape when preformed puck 200 is viewed in a top-down manner. Central region 222 may be arranged centrally on circular plate 204 of preformed puck 200. Annular region 224 may surround central region 222 of circular plate 204. Annular region 224 may extend from central region 222 to upstanding wall 206 (and in some embodiments may include upstanding wall 206).

In some embodiments, first temperature of central region 222 may be about 90° C. to 160° C. However, one of ordinary skill in the art will understand that the temperature selected depends in part upon the material used to form preformed puck 200 (and the glass transition temperature of the material). First temperature may be at or above a glass transition temperature of the material of preformed puck 200. Second temperature of annular region 224 may be greater than the first temperature. In some embodiments, second temperature may be about 1° C. to about 25° C. greater than the first temperature, about 5° C. to about 20° C. greater than the first temperature, or about 10° C. to about 15° C. greater than the first temperature. As annular region 224 is heated to a higher temperature than central region 222, annular region 224 is more compliant and will stretch or deform to a greater extent than the relatively cool central region 222 during molding.

In some embodiments, a second annular region 226 may be at a third temperature that differs from the first and second temperatures. Second annular region 226 may surround annular region 224, and second annular region 226 may be the outermost region of preformed puck 200. Second annular region 226 may encompass flange 210, and in some embodiments may also encompass upstanding wall 206. In some embodiments, the third temperature may be less than the first and second temperatures. In some embodiments, the third temperature is ambient temperature or "room" temperature, such that the second annular region 226 is not heated. If the second annular region 226 is not heated, the second annular region 226 is not stretched or deformed during the blow molding process. For example, when second annular region 226 encompasses flange 210, flange 210 of preformed puck 200 is maintained in the same configuration in the resulting article 400 formed as the result of the blow molding process. In this way, flange 210 of resulting article 400 may be substantially flat and is not deformed by the molding process.

Preformed puck 200 may be heated using any of various heating devices, such as an electrical resistance heating element (see, e.g., heater 600 in FIG. 1A). Electrical resistance heating element may be configured to as to heat a first region of preformed puck 200 to a first temperature and a second region of preformed puck to a second temperature (e.g., central and annular regions). For example, an electrical resistance heating element may include a first heating coil having a circular shape for heating central region 222 of preformed puck 200 and a second heating coil having an annular shape for heating annular region 224 of preformed puck 200. Preformed puck 200 may be conductively heated. Conductive heating allows for precise heating of different regions of preformed puck 200 to different temperatures.

Figure 7:
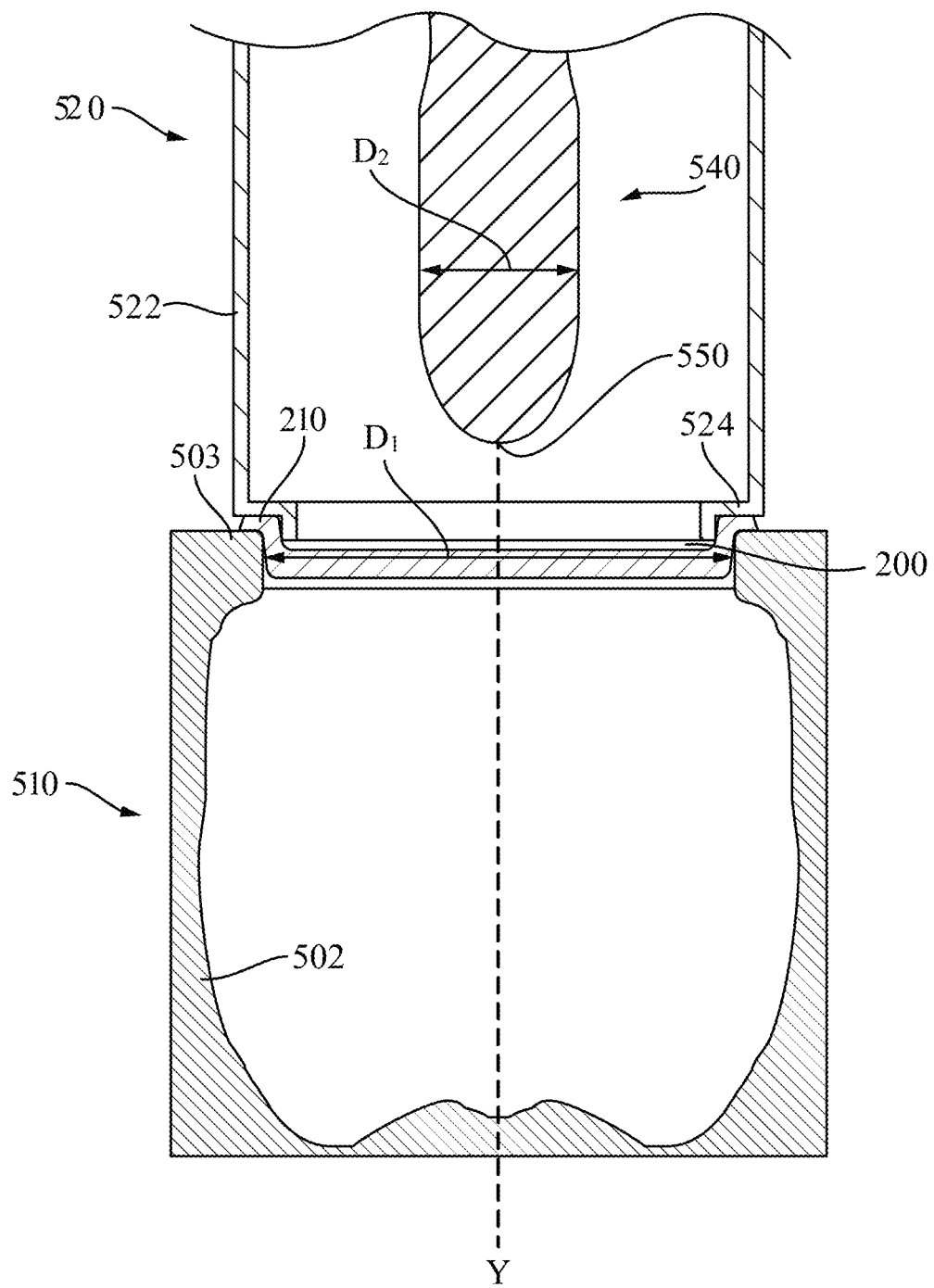
FIG. 7 shows a schematic diagram of a molding apparatus in which a preformed puck is arranged on an upper end of a mold according to an embodiment.

The heated preformed puck 200 may be arranged on an open upper end 503 of a mold 500 having a mold cavity 510 with an inner wall 502 that defines an outer shape of the desired article, as shown in FIG. 7. Particularly, flange 210 of puck 200 may rest on upper end 503 of mold 500. Heated preformed puck 200 may be secured on upper end 503 of mold cavity 510 by a securing member 520 of mold 500. Securing member 520 may include a tubular shaft 522 surrounding a plunger 540 of mold 500. Lower end 524 of tubular shaft 522 may be placed in contact with flange 210 of preformed puck 200 so that flange 210 is arranged between upper end 503 of mold cavity 510 and lower end 524 of tubular shaft 522. In this way, flange 210 maintains its shape during the molding process so that the resulting article has a flat flange.

Figure 8:
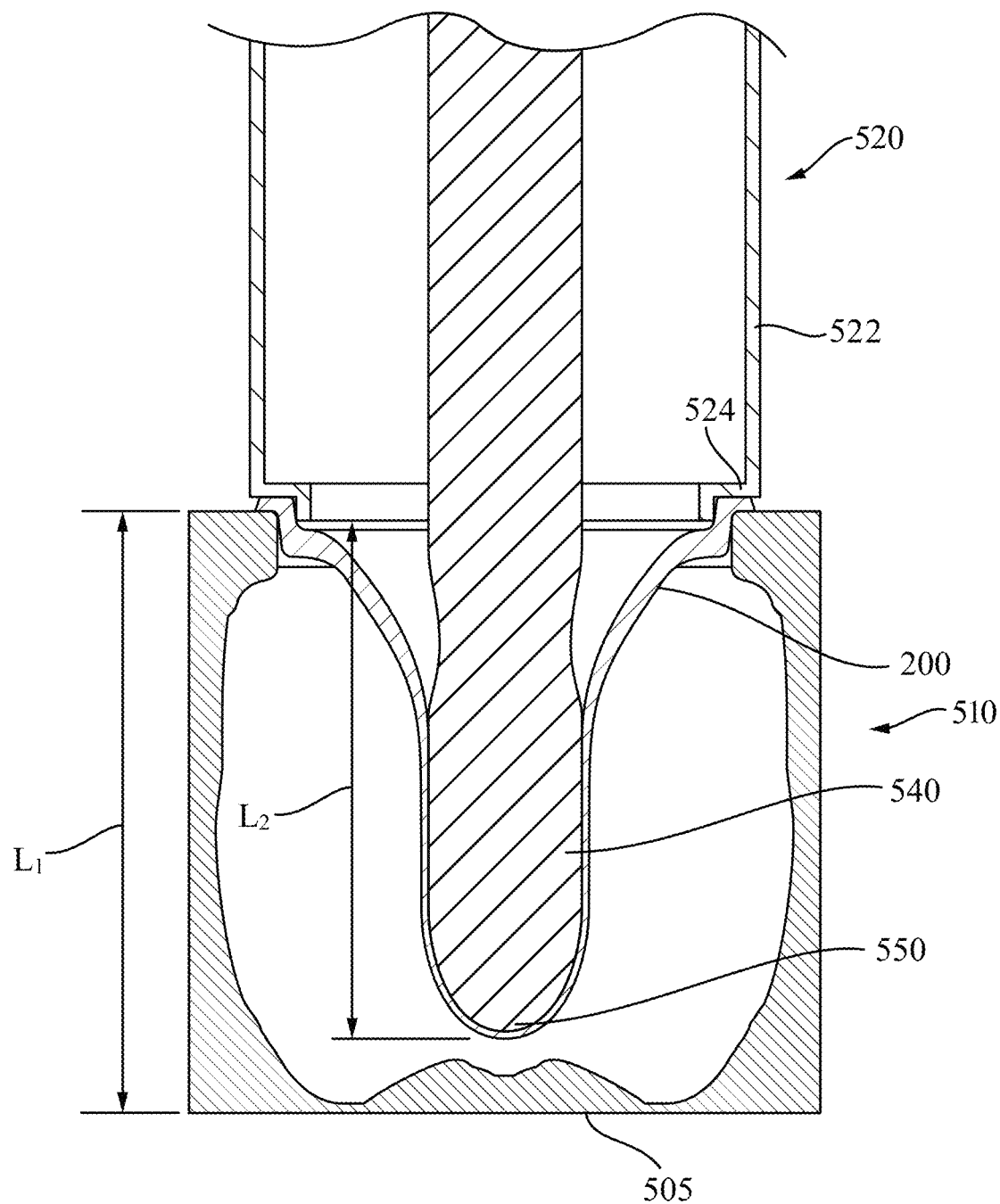
FIG. 8 shows a schematic diagram of the molding apparatus of FIG. 7 in which a portion of the preformed puck is stretched by a plunger.

The heated preformed puck 200 is stretched, such as by a plunger 540, as shown in FIG. 8. Plunger 540 is arranged in a direction of a longitudinal axis Y of mold 500 and is moved toward mold cavity 510 along axis Y so as to contact heated preformed puck 200 and press a portion of heated preformed puck 200 (e.g., the portion formed by circular plate 204) into mold 500. Plunger 540 may have a circular transverse cross sectional area, and plunger 540 may have a generally cylindrical shape. In some embodiments, plunger 540 may be formed from a metal, such as a metal, such as aluminum, copper, or steel, or a polymer. Material of plunger 540 may be selected based on the desired thermal conductivity and coefficient of friction for the molding process. For example, a material with a high thermal conductivity may serve as a heat sink. In some embodiments, plunger 540 includes a tip 550 configured to contact preformed puck 200 and press a portion of puck 200 into mold 500. Tip 550 may be rounded and may have a dome-like shape.

Plunger 540 may have a maximum diameter D2 that is less than a diameter D1 of an upper opening of mold cavity 510. In some embodiments, maximum diameter D2 of plunger is 20% to 80% of a diameter D1 of upper opening of mold cavity 510. Reducing maximum diameter D2 of plunger relative to diameter D1 of mold 500 facilitates selection of wall thickness of the resulting article. As the diameter of plunger 540 increases, a greater amount of the preform material is pressed toward a lower portion or base of mold cavity 510, which may result in a container having thin and relatively weaker sidewalls. If the sidewalls are too weak, the resulting article may not have sufficient physical properties to withstand storage and transportation. By reducing a diameter of plunger 540 relative to an opening of mold cavity 510, preform material may be better and more precisely distributed within mold cavity 510.

Further, plunger 540 may have a maximum diameter D2 that is the same as a diameter of central region 222 of preformed puck 200. In this way, plunger 540 may press central region 222 toward a lower end mold 500 such that central region 222 forms a base of the resulting molded article, while stretching annular region 224 of preformed puck 200 so that annular region 224 forms sidewall of the resulting article. Due to their different temperatures as described above, central region 222 may stretch to a lesser degree than annular region 224, resulting in portions of container formed by annular region having a smaller thickness than portions of container formed by central region. Accordingly, thicknesses of different portions of the resulting container may be affected by selection of affected by the diameter of plunger 540 and the central region of preformed puck 200 (in addition to the different first, second, and third temperatures as described above).

In some embodiments, mold cavity 510 has a depth $L_1$ as measured along longitudinal axis X from lower end 505 of mold cavity 510 to upper end 503 of mold cavity 510. Plunger 540 is inserted into mold cavity 510 to a predetermined distance $L_2$ that is less than $L_1$. In some embodiments, plunger 540 may be inserted to a depth $L_2$ that is 50% to 95% of $L_1$, 60% to 90% of $L_1$, or 75% to 85% of $L_1$. Thus, tip 550 of plunger 540 is spaced from and does not contact the inner wall 502 at the lower end 505 of mold cavity 510. The inventors of the present invention found that by inserting plunger 540 to a depth less than $L_1$, the preformed puck 200 more fully and uniformly conformed to a shape of inner wall 502 of mold cavity 510 when pressurized air is applied to mold cavity 510, as discussed below. It is believed that the space between the tip 550 of plunger 540 and inner wall 502 at lower end 505 of mold cavity 510 allows for improved airflow within mold cavity 510 and thus an improved distribution of preformed puck 200 onto inner wall 502 of mold cavity 510.

In some embodiments, plunger 540 may be moved along axis Y at a speed of about 0.05 m/s to about 0.35 m/s, about 0.075 m/s to about 0.30 m/s, or about 0.10 m/s to about 0.25 m/s. It has been found that speed in this range facilitates conformation of the preform material to the lower end 505 of mold cavity 510, and higher speeds resulted in relatively poor distribution of preform material onto lower end 505 of mold cavity 510.

Figure 9:
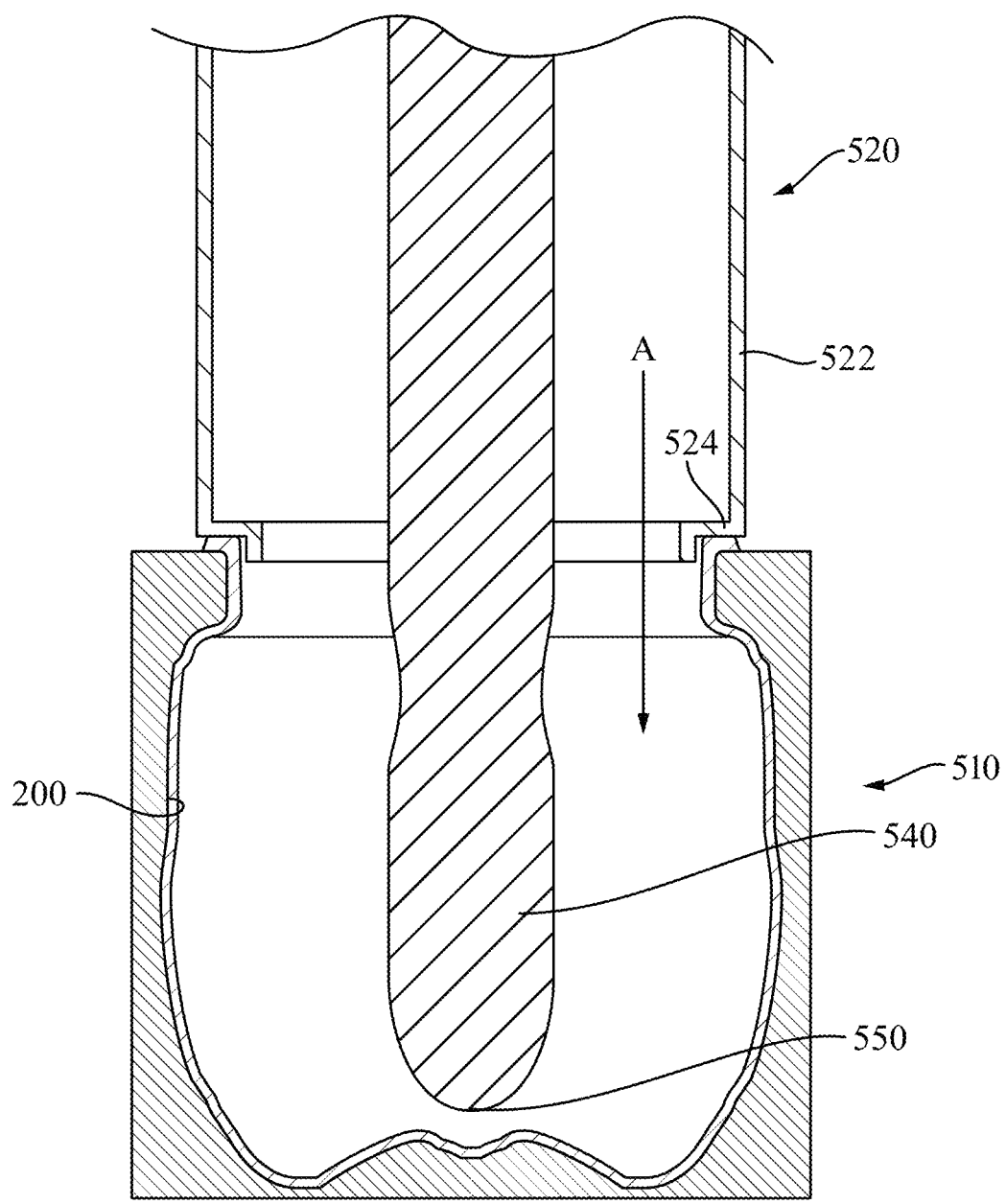
FIG. 9 shows a schematic diagram of the molding apparatus of FIG. 7 in which pressurized air is applied to conform the preform to the shape of the mold.

Once preformed puck 200 is stretched by plunger 540, pressurized air is applied to mold cavity 510 and to preformed puck 200, as shown in FIG. 9. As used herein, pressurized air may refer to any gas, such as air, oxygen, nitrogen, carbon dioxide, or a combination thereof, among other gases. Pressurized air may be applied to the mold at a pressure of 10 bar to 25 bar, 12 bar to 22 bar, or 15 bar to 20 bar. Pressurized air may be applied by, for example, an air compressor. Further, pressurized air may be applied at a constant pressure, rather than by ramping the pressure from a lower pressure to the target pressure. As air is applied at a pressure less than existing blow molding methods, which may use an air pressure of about 40 bar, a smaller condenser may be used which may conserve space and energy.

Figure 10:
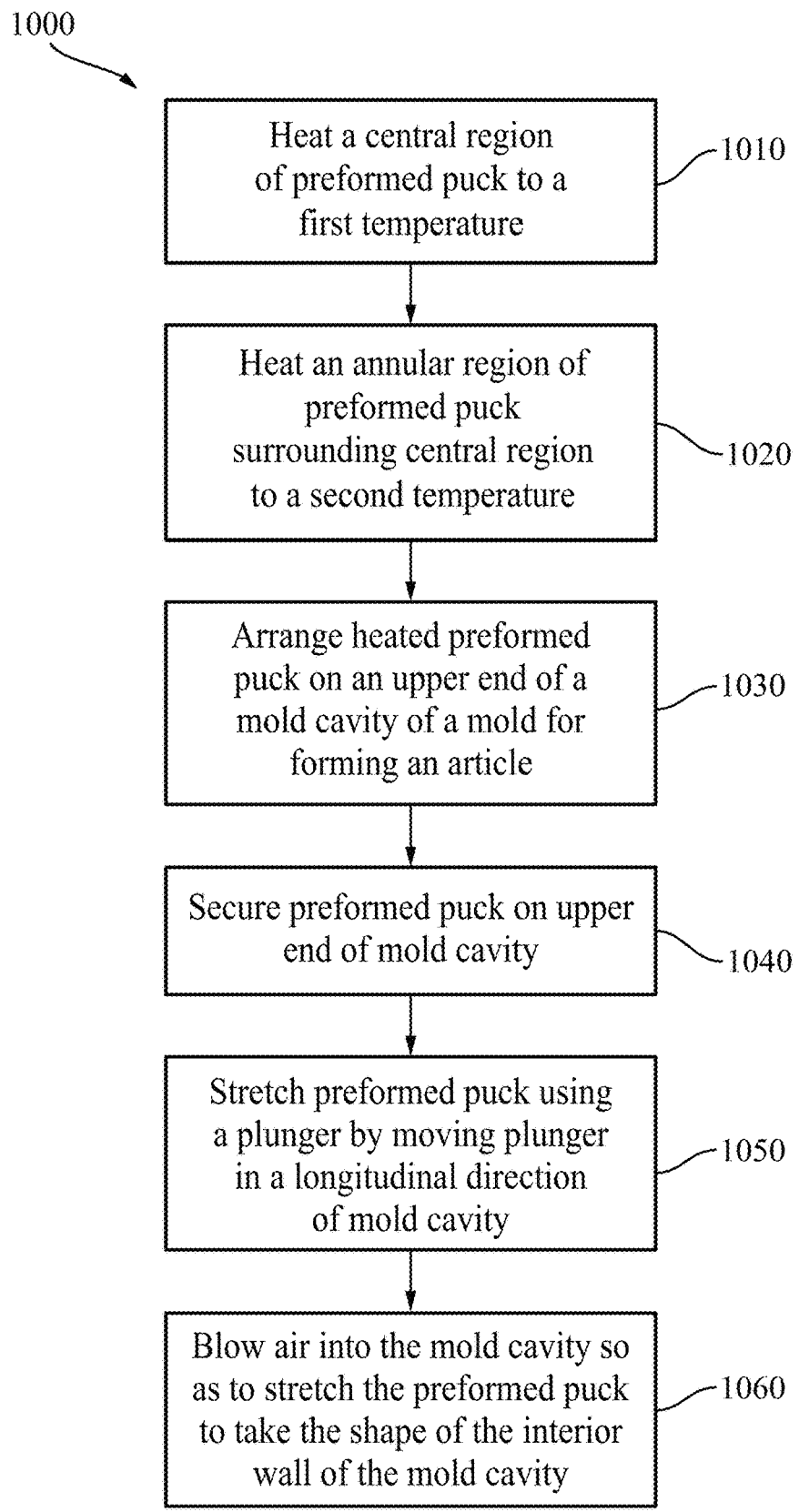
FIG. 10 shows an exemplary method for blow forming an article using a preformed puck according to an embodiment.

An exemplary method of blow molding an article 1000, such as a beverage cartridge, is shown in FIG. 10. At least a portion of a preformed puck (e.g., preformed puck 200, 300) is heated to or above a glass transition temperature of the material of the preformed puck. In some embodiments, a central region of the preformed puck is heated to a first temperature 1010, and an annular region surrounding the central region is heated to a second temperature 1020. The central region and the annular region may be heated simultaneously or sequentially. The heated preformed puck may be arranged on an upper end of a mold cavity of a mold defining a shape of the article 1030. In some embodiments, the preformed puck may be heated after being arranged on the upper end of the mold. The heated preformed puck may be secured on the upper end of the mold cavity by a securing member of the mold 1040. A flange of the preformed puck may be arranged between the upper end of the mold cavity and the securing member in order to maintain the flange in the same position and orientation during molding. The heated preformed puck is stretched by pressing the preformed puck with a plunger 1050. The plunger is moved in a longitudinal direction of the mold toward the mold so that the plunger is perpendicular to the preformed puck and presses a portion of the preformed puck into the mold. The heated preformed puck stretches and deforms as the plunger presses on the preformed puck. The plunger is inserted to a predetermined depth into the mold. Pressurized air is applied to the preformed puck and the mold so that the preformed puck conforms to a shape of the inner wall of the mold 1060. The plunger may then be withdrawn from the mold, and the mold may be cooled. The finished article may then be removed from the mold.

It is to be appreciated that the Detailed Description section, and not the Summary and Abstract sections, is intended to be used to interpret the claims. The Summary and Abstract sections may set forth one or more but not all exemplary embodiments of the present invention(s) as contemplated by the inventors, and thus, are not intended to limit the present invention(s) and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention(s) that others can, by applying knowledge within the skill of the art, readily modify and/or adapt for various applications such specific embodiments, without undue experimentation, and without departing from the general concept of the present invention(s). Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance herein.

What is claimed is:

1. A method for blow molding a container, comprising:
   heating a preformed puck comprising a circular plate and a flange by:
      heating a central region of the circular plate to a first temperature; and
      heating an annular region of the circular plate surrounding the central region of the circular plate to a second temperature, wherein the second temperature is greater than the first temperature such that the annular region is configured to stretch to a greater extent than the central region;
   arranging the heated preformed puck at an upper end of a mold cavity of a mold, wherein an inner wall of the mold cavity defines an outer shape of the container;
   stretching the heated preformed puck by pressing a plunger into the heated preformed puck and into the mold cavity in a longitudinal direction of the mold cavity toward a lower end of the mold cavity; and
   applying pressurized air to the mold cavity so that the heated preformed puck stretches to conform to the shape of the inner wall of the mold cavity.

2. The method of claim 1, wherein stretching the heated preformed puck comprises using the plunger having a maximum diameter that is the same as a diameter of the central region of the circular plate.

3. The method of claim 1, wherein heating the central region and heating the annular region comprises heating the preformed puck using a conductive heating element.

4. The method of claim 1, wherein applying pressurized air is performed with a tip of the plunger spaced from a lower end of the mold cavity.

5. The method of claim 1, wherein applying pressurized air comprises applying the air at a pressure of 15 bar to 20 bar.

6. The method of claim 1, further comprising maintaining the flange of the preformed puck at a third temperature that is less than each of the first temperature and the second temperature and that is below a glass transition temperature of a material of the preformed puck.

7. The method of claim 1, wherein the second temperature is 1° C. to 25° C. greater than the first temperature.

8. The method of claim 1, wherein the preformed puck further comprises an upstanding wall at a perimeter of the circular plate and wherein the flange extends outwardly from an upper end of the upstanding wall.

9. The method of claim 1, wherein the preformed puck comprises polyethyelene terephthalate.

10. The method of claim 1, wherein the annular region is heated to the second temperature throughout a thickness of the preformed puck.

11. A method of blow molding a container, comprising:
heating a central region of a circular plate of a preformed puck to a first temperature at or above a glass transition temperature of a material of the preformed puck;
heating a first annular region of the circular plate of the preformed puck surrounding the central region to a second temperature that is higher than the first temperature;
maintaining a flange that extends outwardly from the circular plate of the preformed puck at a temperature below the glass transition temperature of the material of the preformed puck;
arranging the preformed puck at an upper end of a mold cavity of a mold, wherein an inner wall of the mold cavity defines an outer shape of the container;
securing the preformed puck to the upper end of the mold cavity by a securing member of the mold such that the flange of the preformed puck is secured between the upper end of the mold cavity and the securing member;
stretching the circular plate of the heated preformed puck by pressing a plunger into the heated preformed puck and into the mold along a longitudinal axis of the mold; and
applying pressurized air to the mold so that the preformed puck stretches to conform to the inner wall of the mold.

12. The method of claim 11, wherein the plunger has a maximum diameter that is 30% to 60% of a diameter of an opening of the mold cavity.

13. The method of claim 11, wherein the circular plate of the preformed puck has a greater thickness than a thickness of the flange of the preformed puck.

14. A method of forming a container, comprising:
heating a preformed puck comprising a circular plate, an upstanding wall arranged at a perimeter of the circular plate, and a flange extending outwardly from the upstanding wall, such that a first region of the circular plate of the preformed puck is at a first temperature and a second region of the circular plate of the preformed puck surrounding the first region is at a second temperature that is higher than the first temperature;
maintaining the flange of the preformed puck at an ambient temperature;
arranging the heated preformed puck at an upper end of a mold cavity of a mold, wherein an inner wall of the mold cavity defines an outer shape of the container;
securing the heated preformed puck to the upper end of the mold cavity;
stretching the heated preformed puck using a plunger by pressing the plunger into the heated preformed puck and into the mold cavity along a longitudinal direction of the mold cavity; and
applying pressurized air to the mold cavity when the plunger is at a depth of 50% to 90% of a depth of the mold cavity so that the heated preformed puck conforms to a shape of the inner wall of the mold cavity.

15. The method of claim 14, wherein pressurized air is applied to the mold cavity when the plunger is at a depth of 60% to 80% of the depth of the mold cavity.

16. The method of claim 14, wherein stretching the heated preformed puck comprises pressing the plunger with a speed of 0.10 m/s to 0.25 m/s.

17. The method of claim 14, wherein the flange is not stretched during stretching the heated preformed puck.

18. The method of claim 14, wherein the plunger comprises a rounded tip configured to contact the heated preformed puck.

19. The method of claim 14, wherein the plunger comprises metal.

* * * * *

UNITED STATES PATENT AND TRADEMARK OFFICE
CERTIFICATE OF CORRECTION

PATENT NO. : 12,304,130 B2
APPLICATION NO. : 16/803354
DATED : May 20, 2025
INVENTOR(S) : Bhat et al.

Page 1 of 1

It is certified that error appears in the above-identified patent and that said Letters Patent is hereby corrected as shown below:

In the Claims

In Column 11, Claim 9, Line 10, delete "polyethyelene" and insert --polyethylene--, therefor.

Signed and Sealed this
Eighth Day of July, 2025

Coke Morgan Stewart
*Acting Director of the United States Patent and Trademark Office*